(12) United States Patent
Gregasz et al.

(10) Patent No.: US 9,528,767 B2
(45) Date of Patent: Dec. 27, 2016

(54) HYBRID COOLING TOWER

(71) Applicant: GEA EGI Energiagazdalkodasi Zrt., Budapest (HU)

(72) Inventors: Attila Gregasz, Budapest (HU); Zoltan Domotor, Budapest (HU)

(73) Assignee: GEA EGI Energiagazdalkodasi Zrt., Budapest (HU)

( * ) Notice: Subject to any disclaimer, the term of this patent is extended or adjusted under 35 U.S.C. 154(b) by 88 days.

(21) Appl. No.: 14/708,493

(22) Filed: May 11, 2015

(65) Prior Publication Data
US 2016/0320134 A1 Nov. 3, 2016

(30) Foreign Application Priority Data
Apr. 30, 2015 (HU) ..................................... 1500204

(51) Int. Cl.
*F28C 1/14* (2006.01)
*B01F 3/04* (2006.01)

(52) U.S. Cl.
CPC ............. *F28C 1/14* (2013.01); *B01F 3/04468* (2013.01); *F28C 2001/145* (2013.01)

(58) Field of Classification Search
CPC ....... B01F 3/04; B01F 3/0446; B01F 3/04468; B01F 3/04489

USPC ................... 261/153, 157, DIG. 11, DIG. 77
See application file for complete search history.

(56) References Cited

U.S. PATENT DOCUMENTS 8,622,372 B2 * 1/2014 Schreiber .................. F28C 1/14
261/153

FOREIGN PATENT DOCUMENTS

DE          19926665 A1 * 12/2000  ................ F28C 1/14

* cited by examiner

*Primary Examiner* — Robert A Hopkins
(74) *Attorney, Agent, or Firm* — Wood Herron & Evans LLP (57) ABSTRACT

The present invention generally relates to a cooling tower for a hybrid cooling system. The cooling tower may include a tower shell, a wet cooled segment arranged inside the tower shell, and a dry cooled segment arranged outside the tower shell. The wet cooled segment may include wet cooling cells arranged at a distance from the tower shell with fans arranged thereon for inducing upwards humid air exhaust flow. The dry cooled segment is disposed generally above the air intakes for the wet cells and includes air coolers arranged as vertical cooling deltas around the tower shell. The cooling deltas are equipped with louvers for controlling a cooling air inlet. The cooling tower further includes dry fans arranged in at least some of the inlet openings of the tower shell for inducing mechanical draft for the dry cooled segment.

17 Claims, 8 Drawing Sheets

HYBRID COOLING TOWER

TECHNICAL FIELD

The invention relates to a natural draft assisted induced fan draft hybrid cooling tower, enabling flexible operation and easy maintenance, and to serve mainly large or medium capacity power units.

BACKGROUND ART

A number of fan draft hybrid cooling towers have been developed, the main target of which is visible plume abatement at least in the period of most susceptible for fog formation. In fact, it means practically a primary wet cooling system with an added secondary dry cooled section (approx. with 10% of heat duty). Such hybrid cooling towers are available for smaller or medium heat rejection requirements, and are of individual cell-type or have a row of such cells arranged in a rectangular shape. An example of the cell-type hybrid cooling towers is disclosed in U.S. Pat. No. 3,923,935. A further type of hybrid cooling towers have a round shape and are generally used for large cooling duties—corresponding technical solutions are disclosed e.g. in U.S. Pat. Nos. 6,499,728 B2 and 8,622,372 B2. The latter type of hybrid cooling towers served the Neckarwestheim NPP (nuclear power plant) in Germany and also has been serving the Moorburg coal fired power plant in Hamburg, Germany.

The main object of all these systems is to mix the oversaturated airflow from the wet cooled section with dry airflow from the added dry cooled section to achieve an acceptable reduction of visible plume in winter period.

A major drawback of the prior art hybrid cooling towers is that they necessitate the use of special built-in mixing structures above the wet fills for mixing the dry and humid air strings. Such mixing structures not only represent extra investment cost and reduce the available tower height for inducing natural draft, but they impose a significant pressure loss on the cooling air, thus increasing auxiliary power requirements.

A further bunch of drawbacks originates from the arrangement of the wet fills and their wet fans. Wet fills are located practically all over the tower base, the arrangement extending to the periphery of the tower shell and the forced draft wet fans ar arranged externally with respect of the wet fills. To reduce high fan and hydraulic noises resulted by the arrangement needs sophisticated and costly noise attenuation and leading to further increase of auxiliary power need.

A general disadvantage of the prior art hybrid towers is that their arrangement does not support flexible operation which is required to achieve notable water saving.

There were some further suggestions for mechanical draft cooling towers to create a vortex by applying tangential and downward cooling air inlet, aiming at reducing the fan power or even producing surplus power; see e.g. U.S. Pat. Nos. 4,157,368 and 4,499,034. However, such systems are not adapted/suitable for the known fan draft hybrid cooling towers.

DISCLOSURE OF THE INVENTION

It is an object of the invention to provide a hybrid cooling tower which is free of disadvantages of prior art solutions to the greatest possible extent.

It is a further object of the invention to provide a hybrid cooling tower characterized by high plume abatement capabilities, low pressure loss, low noise emission, efficient air mixing, low maintenance costs and being suitable to be built in conventional cooling tower shells and structures.

The inventive fan draft—assisted with natural draft—hybrid (dry/wet or wet/dry) cooling tower structure and arrangement supports flexible operational characteristics, water conservation and visible plume reducing capabilities as well as improves reliability. A further object of the invention is to improve the maintainability of the encapsulated hybrid cooling system.

The objects of the invention have been achieved by means of the hybrid cooling tower according to claim 1. Preferred embodiments of the invention are defined in the dependent claims.

BRIEF DESCIPTION OF THE DRAWINGS

Preferred embodiments of the invention will be described by way of example with the accompanying drawings, in which.

MODES FOR CARRYING OUT THE INVENTION

The inventive hybrid cooling tower has preferably a round shape, and has a tower shell of either cylindrical or conical or slightly hyperbolic shape. It is intended to operate with high flexibility from point of view of the ratio of dry and wet heat rejection, since the capability of both may spread from 100% to 0%—depending on the ambient conditions, the water availability and price as well as the load conditions. More precisely, the emphasis is on water conservation, thus at low ambient temperatures the dry part shall be able to operate alone, however the wet part may operate in the warmest hours with 100% heat rejection. In areas of severe water scarcity the maximum capacity of the wet part may be only around 30-50% compared to the total heat dissipation. Additionally to the water saving capability, the inventive hybrid cooling tower also provides visible plume reduction. The height of the tower shell may vary from e.g. 40 m to 100 m or preferably approx. 2-5 times the length of the cooling deltas. At least 2 times of the cooling delta height is necessary for the tower shell to be able to produce considerable natural draft. Depending on the tower height the added boost of cooling airflow by the natural draft may be smaller or larger, however the importance of fan draft remains throughout a significant part of the year, and it is essential in the hottest periods. The inventive tower arrangement and structure can be adapted to actual needs with high flexibility, and is characterized by a significant increase of the dry cooled heat rejection capability compared to previous solutions. It shall be noted that the hybrid cooling tower, its structure and arrangement can serve any hybrid cooling system (i.e. cycle connection), irrespective of its specific type—e.g. whether the wet and dry parts are connected in series or they constitute separate circuits.

The dry air coolers are located outside of the tower structure and located all around it vertically disposed on relatively long supporting legs. The air coolers by means of frame structures are arranged in the so-called 'delta' form, being a known erection unit of the dry heat exchangers. Two sides of the triangular shape cooling delta is constituted by air cooler panels, the third one forms an air intake area and is equipped with controlling second louvers. The fans for the dry air coolers are located preferably in the vertical plane in one or more rows along the length of groups of vertical cooling deltas.

In a possible arrangement the whole of each cooling delta length is covered directly by fan suction, however it is possible to deploy the induced draft fans only along a part of the length of cooling deltas—preferably for a lower part or section of them. Since induced draft fans are applied, the air cooler panels also act as noise reducing means (the effect enhanced further by their delta form), thus avoiding the necessity to use separate noise attenuation outside the air cooled heat exchangers. The fan casings may be positioned in circular inlet openings of the tower shell. Such inlet openings in the tower shell are required also for the cooling air stream through those cooling delta sections, which are not covered by dry fan suction.

The tower shell itself has its own supporting tower shell legs supporting the tower shell above a ground level, providing an air intake between the ground level and a lower edge of the tower shell with a height required for cooling air inlet to the wet cells, which are located inside the tower shell preferably side by side arranged in a centered ring-like formation. Alternatively, instead of the ring-like formation, separate individual or twin cells can be applied as well if the maximum wet cooling heat duty remains well under 100%, e.g. only 40% even in the hottest period.

The wet cooling cells also have induced draft fans, however with an upward air exit, i.e. fans are arranged preferably in a horizontal plane. Such 'protected' location of the fans makes completely avoidable saturated humid air recirculation and also any negative wind effect either on fan performance and efficiency or structurally on fan and fan driving. Additionally, location of the wet cells and their fan at a larger distance from the air inlet and outlet makes avoidable to use noise attenuation to reduce hydraulic and fan noise emissions. Thus, in the air path of the wet cooling only simple air intake first louvers are used, which can be arranged either at the outside perimeter of the hybrid tower or directly at the air inlet side of the wet cells.

To avoid excessive pressure losses when dry air is blown in radially, the wet cells within the tower shell are preferably located at a distance from the tower shell larger than the diameter of the dry fans. It is also preferred that the shafts (axes) of the lowest row of dry fans are arranged approximately at the same level or over the outlet plane of the wet fans. The arrangement preferably avoids major impact of the exhausted dry air with the structure of wet cells, thus enabling to make use of dry air dynamic pressure in mixing with the humid exhaust air of wet cells. Increasing the distance from the tower shell may allow reducing the level of the dry fans. During periods of stronger fog formation (at lower ambient temperatures) the dry airflow is overwhelmingly larger than the airflow from the wet cells. The induced draft dry fans blow warm and dry air in the horizontal direction, which gradually inclines upward due to its elevated temperature. This cross blown dry air is efficiently mixed with the humid airflow resulting in reduced visible exhaust plume without any mechanical mixing structures. Therefore, the significant pressure loss imposed by known mixing structures on the cooling air stream in case of the prior art plume abatement towers can be avoided; the effect of such mixing structures is substituted by making use of the dynamic pressure of the fans.

A further opportunity to increase the mixing of the dry and wet airflow is to exhaust dry air streams at an angle with the radial direction through the fans. Orienting the exhausted warmed-up dry air stream from the fans with an angle from the radial direction, i.e. with a tangential vector component, not only increases the mixing effect but via making use of a part of the dynamic fan pressure can generate a vortex with upward swirling motion. In such cases the air exhaust plane has a definitely larger angle with the tower radial direction than the normally used approx. perpendicular direction. It may increase the inlet airflow through both: the dry cooling deltas and the wet cells without extra fan power input. This can be realized either by orienting the axis of the dry fans with an angle from the radial at least partially toward the same tangential direction or by applying suitable baffles or a curved duct section at the air exhaust side for normally oriented fans. Of course, such a curved duct section at its connection to the fan exhaust has a circular cross section, whereas at the outlet any other favorable geometry can be selected together with an adequate transition between the two. For example, one of the advantageous outlet geometry has rectangular shape suitably elongated in the vertical direction, and has a significantly shorter side facing the tower shell. To realize a tangentially inclined exhaust air stream appropriate forms of baffles may be applied at the inward facing side of the tower, wherein the tower shell itself acts as a contour of an imaginary duct.

Application of fans having axis angled from the radial toward the tangential direction can also be combined with the mentioned baffles or curved exhaust duct sections. If the angle of fan axis to the radial is high, it may be advisable to apply baffles or curved duct sections at the air inlet side of the dry fans.

Having warmed up dry air streams inclined to the tangential direction creates also favorable opportunity to apply a single fan row only at the lower section of the cooling deltas; the swirling motion created suction will generate increased cooling air flow through the remaining upper part of the cooling deltas.

Introducing dry and warm air inclined to the tangential direction allows reducing the level of the first row of fans (since—among others—the travelling length of this air stream is increased)—i.e. to put the cooling deltas on shorter legs—if no arrangement, constructional or other reasons are counteracting.

The complexity of a hybrid cooling tower sets special challenges to ensuring not only its well organized and timely erection, but also to realize its easy and efficient maintenance. By means of the present invention these targets are fulfilled by making use of several constructional and functional elements of the hybrid tower applied also as erection/maintenance or access platforms.

Figure 1:
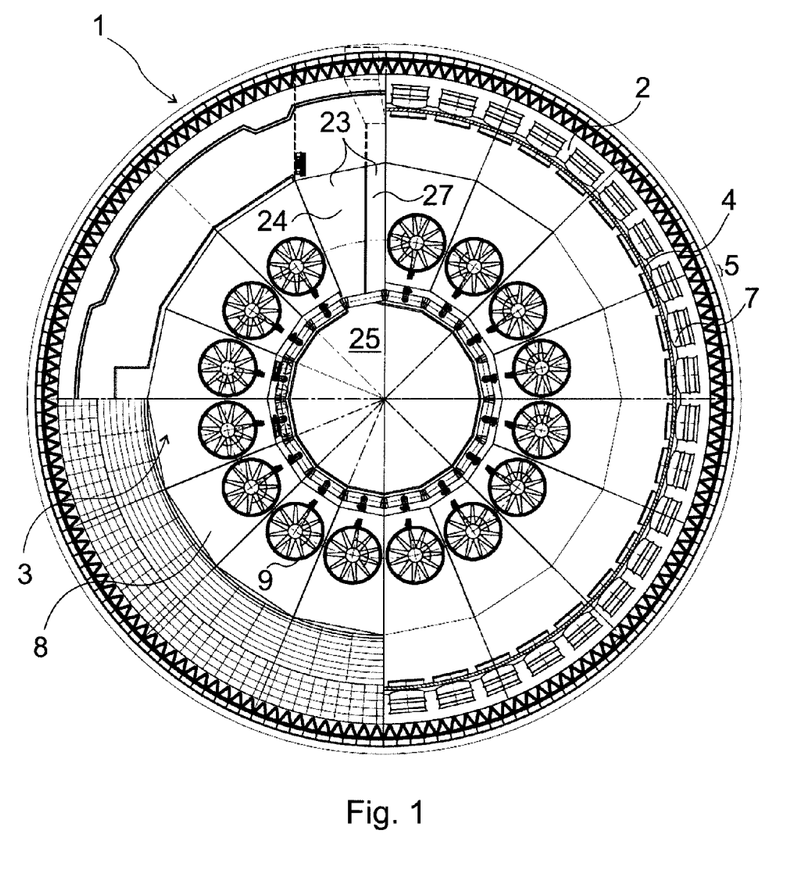
FIG. 1 is a partly sectioned view of an embodiment of a natural draft assisted induced fan draft hybrid cooling tower arrangement.
Figure 2:
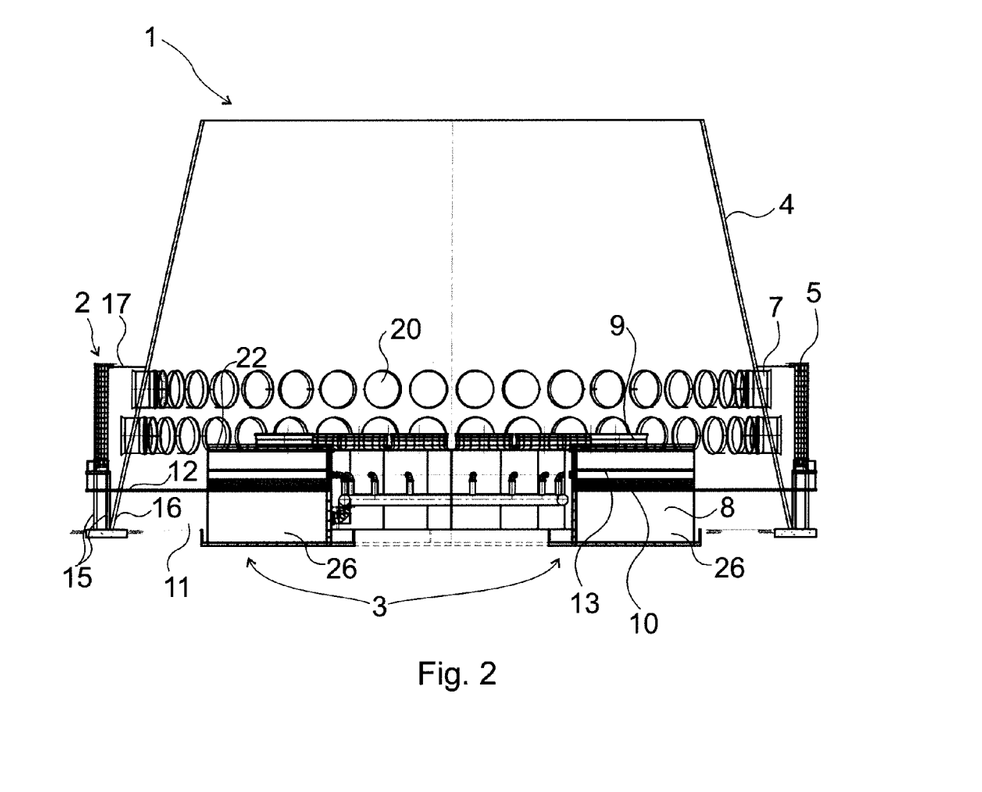
FIG. 2 is a sectional view of the embodiment of FIG. 1.
Figure 3:
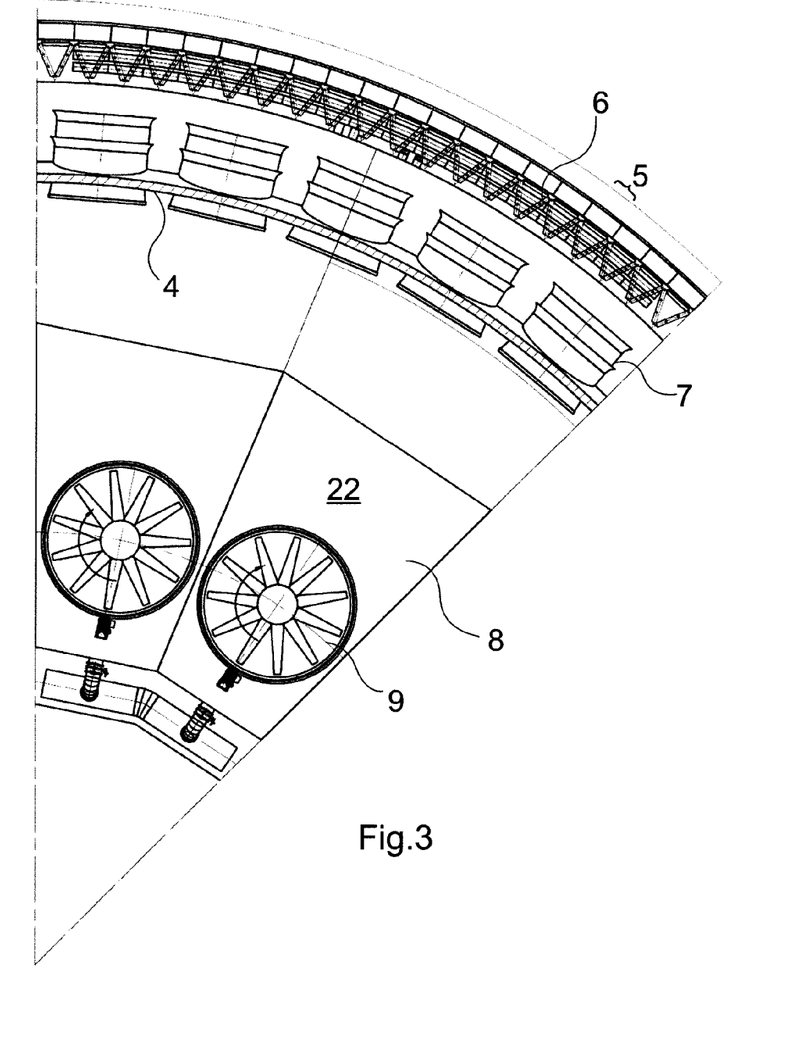
FIG. 3 is a detail of FIG. 1, showing in a plan view the arrangement of the dry cooling equipment and their structures and those of wet cooling.
Figure 4:
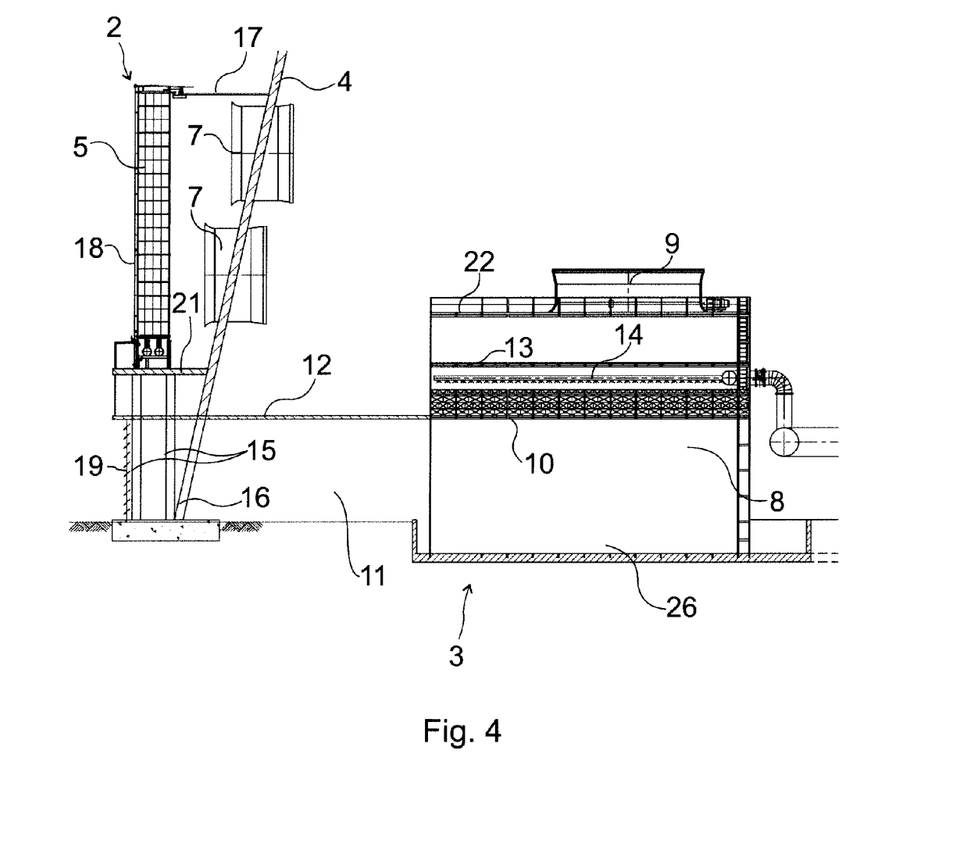
FIG. 4 is a detail of FIG. 2, showing in a sectional view the arrangement of the dry and the wet cooled parts.

A preferred embodiment of the invention is depicted in FIG. 1 in plan view and in FIG. 2 in sectional view. Further details of the embodiment in FIGS. 1 and 2 are shown in FIG. 3 and FIG. 4. The upper left quarter of FIG. 1 shows the base structure, the right half thereof shows the structure without the tower shell above the dry fans, and the lower left quarter shows the top view of the complete structure.

The hybrid cooling tower 1 comprises a dry cooled segment 2 and a wet cooled segment 3. This embodiment is able to serve an especially flexible hybrid tower 1, where each of the dry and wet heat rejections is able to operate even with 100% heat dissipation capacity if it is required. An additional feature is that the hybrid tower has duplicate draft: mechanical draft by induced draft fans for both the dry cooled segment 2 and the wet cooled segment 3 and it is assisted with natural draft as well.

The dry air coolers are arranged in the so-called cooling delta form 5. Two sides of its triangular shape cross section is constituted by air cooler panels 6, the third side is equipped with air intake second louvers 18. Induced draft fans, called as dry fans 7, in two rows above each other are positioned in the vertical plane and inducing suction along the whole length of the vertical cooling deltas. The air cooler panels 6 themselves besides dry heat dissipation, also act as noise reducing means. Their effect is further enhanced by their arrangement in delta formation 5. These make unnecessary to apply separate, rather costly noise attenuation outside the air cooled heat exchangers, i.e. cooling deltas 5.

The dry fans 7 and their casings are positioned in circular inlet openings 20 of the tower shell 4. The cooling deltas 5 have their own frame structure, located outside of the cooling tower shell 4 all around it disposed vertically on relatively long supporting legs, called cooling delta legs 15, independently from the tower shell 4. From the tower shell 4 there extends a widening cover 17 toward the top of the cooling deltas 5.

The tower shell 4 itself has its own supporting legs 16 with a height required for cooling air intake (gap) to the wet cells 8, which are located inside the tower shell. At this embodiment the wet cells 8 are arranged side by side in a ring-like formation.

The wet cooling cells 8 also have induced draft fans with an upward air exit, called as wet fans 9 being preferably arranged in an essentially horizontal plane on top of the wet cells for inducing upwards humid air exhaust flow. Such 'protected' location of the wet fans 9 excludes completely the saturated humid air recirculation and also any negative wind effect either on fan performance and efficiency or structurally on wet fan 9 and fan driving. In addition, location of the wet cells 8 and their fan 9 are in a larger distance from cooling air inlet/outlet, which makes avoidable the use of noise attenuation to reduce hydraulic and wet fan 9 noise emissions. Thus, at the air intake of an air duct space 11 to the wet cells 8 of the hybrid cooling tower 1 only simple wet cell air intake first louvers 19 are used, which can be arranged either at the outside of the hybrid tower 1—e.g. at the air intake—as shown in FIG. 4 or further directly at the air inlet side of the wet cells 8. In the first case the air duct space 11 may be divided by vertical walls into air duct channels guiding the cooling air from respective sections of the air intake to respective wet cells 8, whereas in the second case the wet cells 8 may share a common air duct space 11.

Slightly above the height of the inside cover 12 of the air duct space 11, in each of the wet cells 8, there is a wet fill 10, horizontally thereabove sprayers 14, and further above a drift eliminator 13 (these three structural parts are known per se). The inside cover 12 separates ambient air streaming towards the wet cells 8 and the warmed up air entering the tower shell 4 via said inlet openings 20. Thus, the cooling air entering at the air intake for the wet cells 8 does not deteriorate the plume abatement effect, whereas the warmed up air entering via the inlet openings 20 does not reduce the cooling efficiency at the wet fill.

Some of the constructional and functional elements of the hybrid cooling tower 1 are used also as erection/maintenance platforms as well as access to the equipment.

Under the wet cells 8 arranged in a ring like formation is a water basin 26, as depicted in FIG. 1. In the middle of the ring there is a circular or polygonal shape concrete cover 25, which can be used for erecting and maintaining wet cells 8 by mobile cranes. The empty wet cell area 23 comprises an access road 24 which gives an access for mobile cranes to the cover 25. Another smaller section of the empty wet cell area 23 (being a radial access platform) is used as an access ramp 27 to the basin of the wet cells 8 for their cleaning and/or maintenance.

The upper covering 22 of wet cells is used also as platform for access and maintenance of wet fans 9 and their driving and instruments, as depicted in FIGS. 2 and 4.

The inside cover 12 for the air duct space 11, at the same time serves also as a platform to provide access to the dry fans 7 of dry air cooling deltas 5 for erecting and maintaining them by mobile cranes, as depicted in FIG. 4.

There is a stiffening and connecting plate between the tower shell 4 and the outside cooling delta legs 15 running all around the tower shell (FIG. 4), that can be used as an erection and maintenance platform 21 for bottom parts of the dry cooling deltas 5, the cooling delta connections to cooling water piping, louvers actuators, cooling delta bottom headers and the related instruments.

Figure 5:
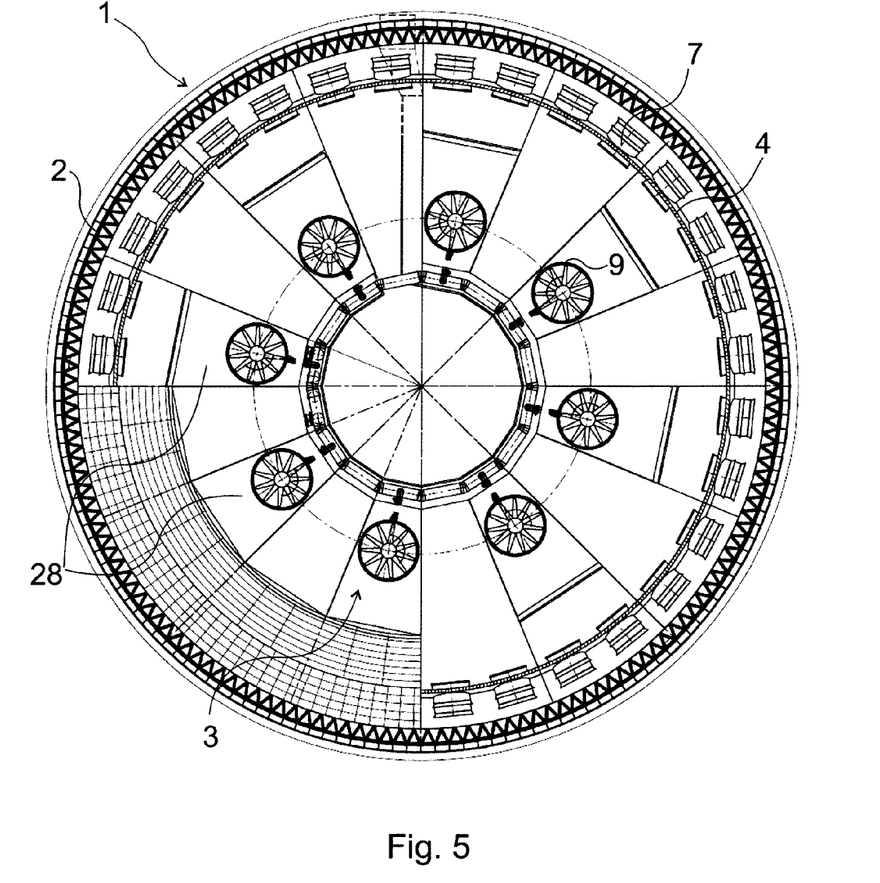
FIG. 5 is a further preferred embodiment of the hybrid cooling tower, in which individual wet cells are applied.

Another embodiment is shown in FIG. 5 (except for its lower left quarter, showing the structure without the tower shell above the dry fans). It is applicable for hybrid cooling towers 1, which are designed for higher rate of water saving, therefore even in the hottest summer hours their wet capacity remains well under 100%, e.g. it is in the range of 40-60% only. FIG. 5 shows more or less a similar arrangement as it was shown by FIGS. 1 and 2 just instead of a ring like wet cell 8 arrangement individual wet cells are applied. A wide variety of other shapes and arrangements are also conceivable for such individual wet cells. They can be rectangular, trapezoid, and circular or arranged in twin cells. Even similar ring like arrangement could be applied as used for the higher wet capacity solution like in FIGS. 1 and 2, however, a significantly larger inner circle (or a smaller outer circle) shall be applied for the ring adapted to the lower wet cooling capacity requirements.

FIGS. 1, 2, 3 and 4 depict an embodiment, wherein the whole length of the cooling deltas 5 is covered directly by fan suction. Specifically at this embodiment, dry fans 7 are located in two rows in the vertical plane. For shorter cooling deltas 5 even a single dry fan row can be applied, for larger ones perhaps more than two rows are required to cover with fan suction the whole length of the cooling deltas 5.

Figure 6:
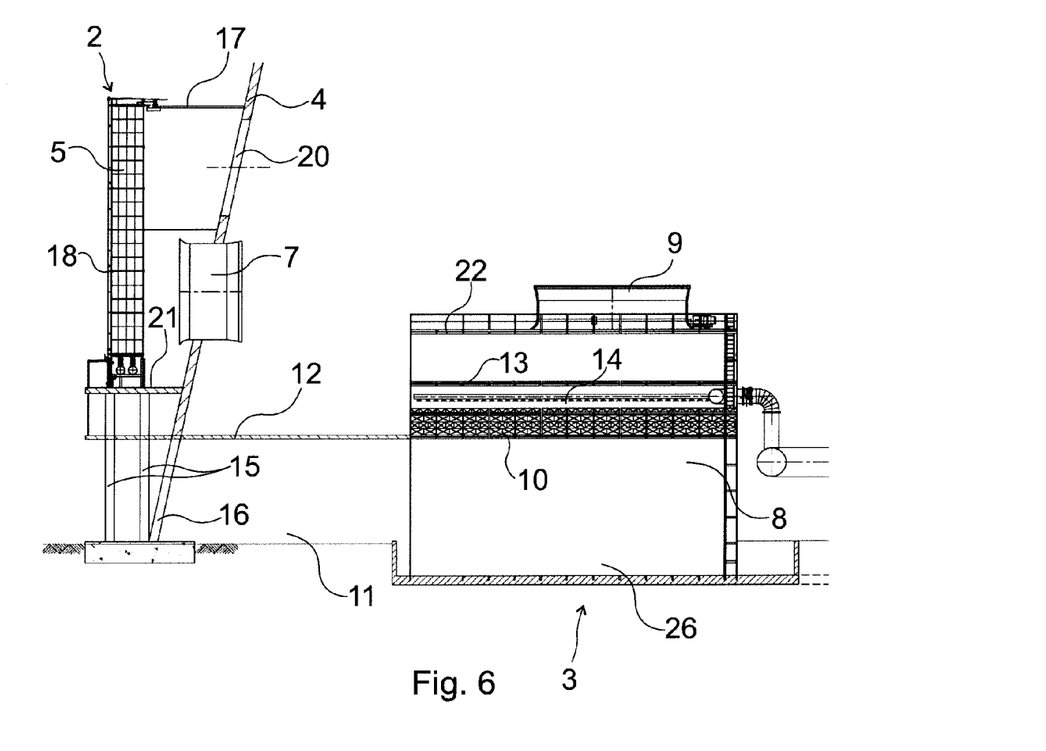
FIG. 6 is a similar sectional arrangement as in FIG. 4 with the exception that the induced draft dry fans cover only the lower section of cooling deltas.

Under certain conditions—like in case of a taller tower, thus higher natural draft—it can be advantageous to provide fan draft only for a part of the cooling delta 5 length preferably for its lowest section. FIG. 6 shows such an embodiment. Of course, it is essential that in front of those cooling delta 5 sections having no direct fan suction, appropriate tower shell inlet openings 20 for air flow shall be available as it is shown by FIG. 6.

Figure 7:
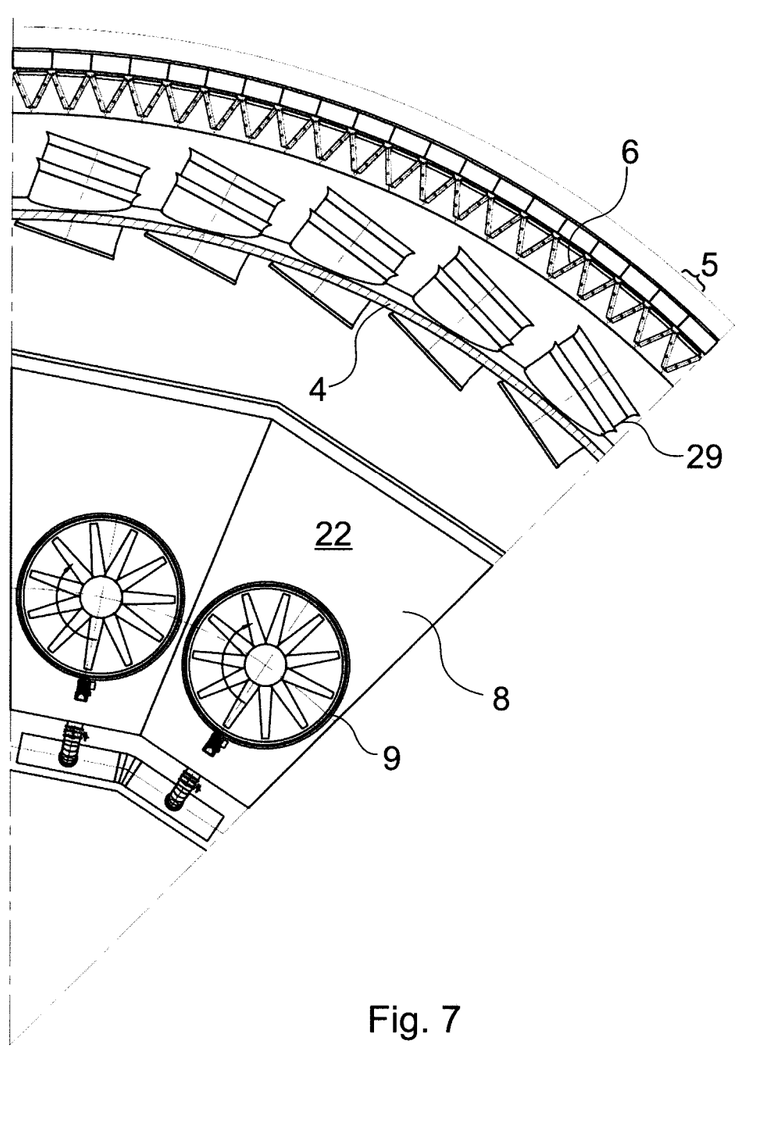
FIG. 7 is a plan view of a section of a preferred hybrid tower embodiment, where the axis of dry fans (at least those in the lowest row) are oriented with an angle to the radial direction.
Figure 8:
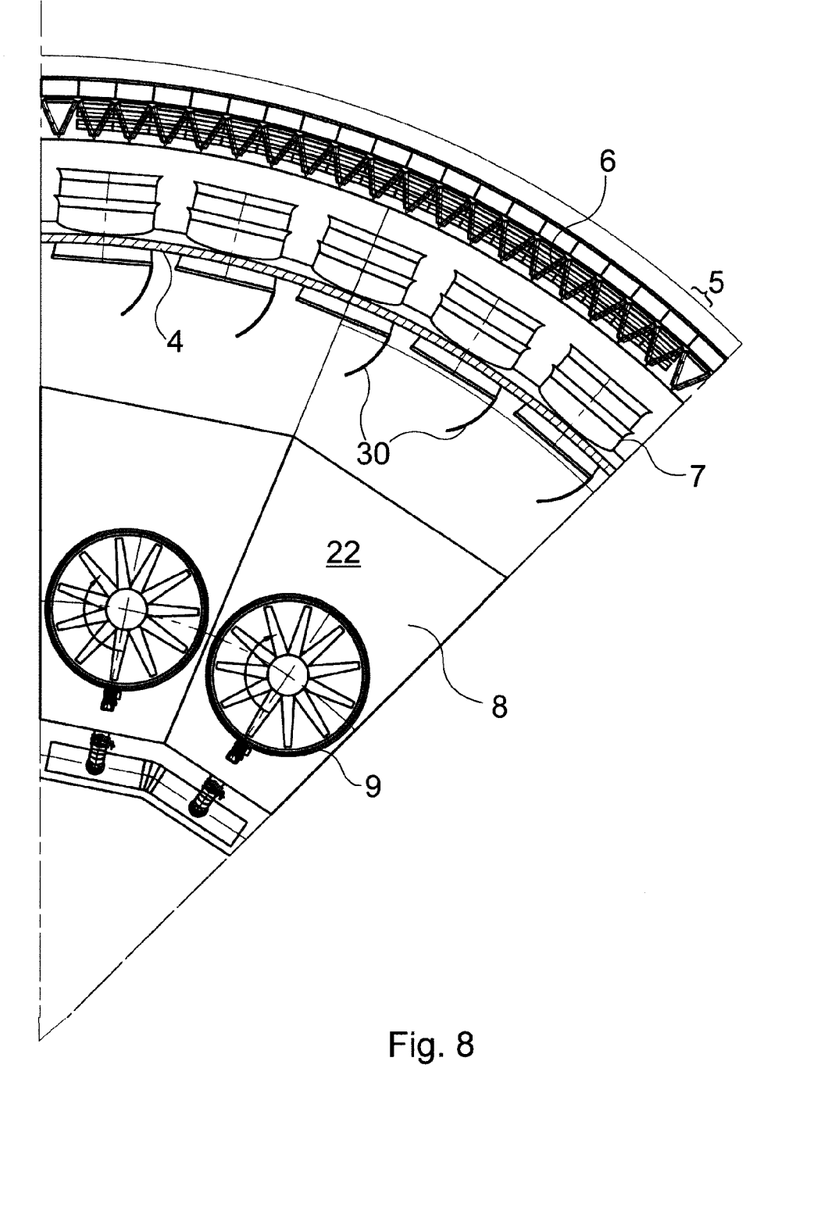
FIG. 8 is a variant of FIG. 3, in which the dry fans are equipped with baffle plates.

One version of a whole range of especially favorable embodiments is shown by FIG. 7. Basically similar hybrid cooling tower 1 arrangement and construction can be applied as in case of any of the previously introduced variants—the exception is the orientation of warmed up dry cooling air stream exhausted by fans at least by those of the lower section of cooling deltas 5. In FIG. 7 the axes of dry fans 29 are not radial but inclined toward the tangential direction—thus the exhausted warmed up dry air stream also inclined to the tangential direction. This can generate a swirling upward air flow, with the consequence of creating an increased suction not only for the dry cooling deltas 5, but also for the wet cells 8. In addition, even it can improve mixing of the dry and humid air—and all these without extra power input. The same effect can be realized by applying dry fans 7 with axes oriented in the usual radial direction, but applying suitable baffles 30—as shown by FIG. 8—or applying a curved duct section at the air exhaust side for normally oriented fans. Application of fans having axes with an angle from the radial toward the tangential direction can be combined with the mentioned baffles 30 or curved exhaust duct sections as well. At significantly higher angle of fan axis to the radial, it may be advisable to use baffles or curved duct sections at the air inlet side of the dry fans and no such means at the air exhaust side.

It is remarkable that the swirling motion created suction could generate adequately high cooling air flow through those parts of the cooling deltas 5, which have no directly attached fans (see FIG. 6), thus a favorable opportunity can be created for applying only a single dry fan row.

It shall be emphasized that the favorable embodiments are not limited to those introduced herein in details via figures. They also include those solutions combining some of the introduced features as well as those although having some modifications, however maintains the essential spirit and scope of our invention. Thus the invention is not limited to the preferred embodiments described in details above, but further variants, combinations, modifications and developments are possible within the scope determined by the claims.

The invention claimed is:

1. A hybrid cooling tower for a hybrid cooling system; the hybrid cooling tower comprising
    a tower shell being supported by tower shell legs above a ground level, providing an air intake between the ground level and a lower edge of the tower shell;
    a wet cooled segment arranged inside of the tower shell and having wet cooling cells arranged at a distance from the tower shell and receiving cooling air through the air intake and via first louvers;
    wet fans arranged on top of the wet cells for inducing upwards humid air exhaust flow;
    a dry cooled segment being arranged outside of the tower shell above said air intake for wet cells, the dry cooled segment having air coolers being arranged as vertical cooling deltas around the tower shell equipped with second louvers for controlling cooling air inlet, the dry cooled segment being supported by cooling delta legs, the tower shell having inlet openings arranged along the dry cooled segment for the air warmed up by the dry cooled segment; and
    dry fans arranged in at least some of the inlet openings of the tower shell, for inducing mechanical draft for the dry cooled segment and for driving air warmed up by the dry cooled segment into mixture with the humid air exhaust flow;
    wherein the tower shell has a height of at least 2 times that of the cooling deltas for inducing a natural draft; and
    wherein the hybrid cooling tower further comprises an inside cover defining an air duct space between the air intake and the wet cells, the inside cover separating ambient air streaming towards the wet cells and the warmed up air entering the tower shell via said inlet openings.

2. The hybrid cooling tower according to claim 1, wherein the wet cells are arranged in a centered ring like pattern having at least two wet cells spaced from each other, and between the two spaced wet cells a radial access platform is provided to a center area of the hybrid cooling tower.

3. The hybrid cooling tower according to claim 1, wherein separate wet cells, being individual or twin wet cells, are arranged inside the tower shell, the wet cells having a formation, number and size adapted to the required wet cooling assisting the dry cooling capacity.

4. The hybrid cooling tower according to claim 1, wherein the air duct space is divided by vertical walls into air duct channels guiding the cooling air from respective sections of the air intake to respective wet cells.

5. The hybrid cooling tower according to claim 4, wherein said first louvers are arranged at the air intake.

6. The hybrid cooling tower according to claim 1, wherein the wet cells share a common air duct space and said first louvers are arranged at the entering of the wet cells.

7. The hybrid cooling tower according to claim 1, wherein each of the wet cooling cells is spaced from the tower shell by at least the diameter of the dry fans.

8. The hybrid cooling tower according to claim 1, wherein said dry fans are arranged in at least one row.

9. The hybrid cooling tower according to claim 8, wherein the draft induced by said row of the dry fans covers a lower section of each cooling delta.

10. The hybrid cooling tower according to claim 9, wherein at least a second row of the dry fans is arranged above the first row, and the draft induced by the dry fans covers the whole length of each cooling delta.

11. The hybrid cooling tower according to claim 7, wherein at least a part of the air warmed up by the dry cooled segment is driven with a tangential flow vector component into the tower shell.

12. The hybrid cooling tower according to claim 11, wherein the tangential flow vector component is provided by at least one row, preferably the lowest row of the dry fans partly directed in a same tangential direction.

13. The hybrid cooling tower according to claim 12, wherein the tangential flow vector component is provided by baffles or curved duct sections, being inclined towards the same tangential direction, and being arranged at air exhaust sides of at least some of the dry fans.

14. The hybrid cooling tower according to claim 12, wherein the tangential flow vector component is provided also by baffles being inclined towards the same tangential direction, and being arranged at air inlet sides of at least some of the dry fans.

15. The hybrid cooling tower according to claim 2, comprising at least one further access platform being
    a circular or polygonal cover in the center area of the hybrid cooling tower;
    a section of the radial access platform being formed as an access ramp to a common basin of the wet cells;
    an upper covering of wet cells; and/or
    a connecting plate extending from the tower shell to the outside cooling delta legs above the air intake.

16. The hybrid cooling tower according to claim 1, wherein said dry fans are arranged relative to the wet cells to avoid major impact of the exhausted dry air with the structure of wet cells, thus enabling to make use of dry air dynamic pressure in mixing with the humid exhaust air of wet cells.

17. The hybrid cooling tower according to claim 1, wherein the dry fans are arranged to blow the warmed up dry air in radial direction and are positioned in a way that the level constituted by the axes of the dry fans in a lowest fan row are at about the same level as the plane defined by the horizontal wet fans' air exhaust, thus the dry fans cross-blow dry air into the outlet humid air exhausted by the wet cells.

\* \* \* \* \*